(12) United States Patent
Matsumoto et al.

(10) Patent No.: US 9,623,736 B2
(45) Date of Patent: Apr. 18, 2017

(54) OPENABLE VEHICLE ROOF STRUCTURE (71) Applicant: Mazda Motor Corporation, Hiroshima (JP)

(72) Inventors: Kouichi Matsumoto, Hiroshima (JP); Eisuke Kuramoto, Hiroshima (JP); Tomohiro Komaji, Higashihiroshima (JP); Motonori Horii, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/825,975

(22) Filed: Aug. 13, 2015

(65) Prior Publication Data
US 2016/0059681 A1 Mar. 3, 2016

(30) Foreign Application Priority Data
Aug. 29, 2014 (JP) ................................. 2014-174794

(51) Int. Cl.
*B60J 7/12* (2006.01)

(52) U.S. Cl.
CPC ........... *B60J 7/1265* (2013.01); *B60J 7/1234* (2013.01); *B60J 7/1243* (2013.01); *B60J 7/1247* (2013.01); *B60J 7/1252* (2013.01)

(58) Field of Classification Search
CPC ...... B60J 7/1234; B60J 7/1247; B60J 7/1252; B60J 7/1265; B60J 7/1243
See application file for complete search history.

(56) References Cited

U.S. PATENT DOCUMENTS

| 4,712,828 A | * | 12/1987 | Albrecht | ................ B60J 7/1265 16/348 |
| 5,971,470 A | * | 10/1999 | May | ........................ B60J 7/1265 296/107.09 |
| 6,513,857 B2 | * | 2/2003 | Pfertner | ................. B60J 7/1265 296/107.07 |
| 6,755,457 B2 | * | 6/2004 | Grubbs | ...................... B60J 7/22 296/107.09 |

(Continued)

FOREIGN PATENT DOCUMENTS

| DE | 522235 C | * | 4/1931 | ............ B60J 7/1234 |
| DE | 657437 C | * | 3/1938 | ............ B60J 7/1265 |

(Continued)

*Primary Examiner* — Glenn Dayoan
*Assistant Examiner* — Paul Chenevert
(74) *Attorney, Agent, or Firm* — Studebaker & Brackett PC (57) ABSTRACT

An openable roof includes an expandable and retractable awning frame, and an awning cloth for covering the outside of the awning frame. The awning frame is provided with an awning bow which supports the awning cloth when the awning frame is expanded. The awning bow includes a pair of left and right leg portions extending in up and down directions, and an upper side portion which connects between upper ends of the leg portions in a vehicle width direction. Each of the leg portions of the awning bow is formed with two or more bent parts. At least one pair of the bent parts on each of the leg portions are configured such that moments generated in the awning bow due to a tensile force exerted from the awning cloth when the openable roof is in an expanded state act in such directions as to cancel out each other.

2 Claims, 9 Drawing Sheets (56) References Cited

U.S. PATENT DOCUMENTS

| | | | | |
|---|---|---|---|---|
| 6,966,599 | B2 * | 11/2005 | Willard | B60J 7/1243 296/107.09 |
| 7,029,052 | B2 * | 4/2006 | Troeger | B60J 7/1265 296/107.19 |
| 7,100,962 | B2 * | 9/2006 | Schartner | B60J 7/1265 296/107.01 |
| 7,581,776 | B2 * | 9/2009 | Quindt | B60J 7/1265 296/107.09 |
| 8,840,142 | B2 * | 9/2014 | Fujiwara | B60R 21/045 280/748 |
| 2016/0059683 | A1 * | 3/2016 | Komaji | B60J 7/1851 296/121 |

FOREIGN PATENT DOCUMENTS

| | | | | | |
|---|---|---|---|---|---|
| DE | 706684 | C | * | 6/1941 | B60J 7/1204 |
| DE | 809137 | C | * | 7/1951 | B60J 7/1265 |
| DE | 19903411 | C1 | * | 10/2000 | B60J 7/1265 |
| DE | 19962995 | A1 | * | 7/2001 | B60J 7/1204 |
| DE | 102006010691 | A1 | * | 9/2007 | B60J 7/1265 |
| FR | 651986 | A | * | 3/1929 | B60J 7/1265 |
| FR | 664026 | A | * | 8/1929 | B60J 7/1226 |
| GB | 203889 | A | * | 9/1923 | B60J 7/1265 |
| GB | 312281 | A | * | 4/1930 | B60J 7/1265 |
| GB | 647031 | A | * | 12/1950 | B60J 7/1265 |
| GB | 1110640 | A | * | 4/1968 | B60J 7/1265 |
| JP | 2006-232045 | A | | 9/2006 | |

\* cited by examiner

OPENABLE VEHICLE ROOF STRUCTURE

This application is based on Japanese Patent Application No. 2014-174794 filed in Japan Patent Office on Aug. 29, 2014, the contents of which are hereby incorporated by reference.

BACKGROUND OF THE INVENTION

Field of the Invention

The present invention relates to an openable vehicle roof structure provided with an openable roof including an expandable and retractable awning frame, and an awning cloth for covering the outside of the awning frame, and capable of openably covering a vehicle body upper portion by the openable roof.

Description of the Related Art

Generally, an openable roof for openably covering a vehicle body upper portion is provided with an awning frame which is expandable and retractable with respect to a vehicle body, and an awning cloth for covering the outside of the awning frame.

For instance, an openable roof structure disclosed in Japanese Unexamined Patent Publication No. 2006-232045 (hereinafter, called as Patent Literature 1) is configured such that an awning frame is provided with a top frame, which is laterally provided on a front end of the awning frame, and which is attachably and detachably fixed to a front header on the vehicle body side (a member for supporting the upper edge of a front window glass); a pair of left and right side frames, which are mounted on left and right sides of the top frame, and which extend while curving along the opening edge of each door glass of a vehicle body; a pair of left and right control links, each of which controls folding operations of a front frame and a rear frame constituting each of the side frames; and three awning bows disposed to bridge between the paired side frames. In the following, a state such that the openable roof is expanded to cover the vehicle body upper portion is called as a roof expanded state, and a state such that the openable roof is folded and accommodated in a vehicle body (a state that the vehicle body upper portion is opened) is called as a roof retracted state.

When the openable roof is in a roof expanded state, the top frame is engaged with a striker on the front header side by a fixing device located on a lower middle portion of the top frame in the vehicle width direction. The awning cloth is stretched in such a manner as to cover an upper side portion extending in the vehicle width direction of each of the awning bows, and the top frame. A lower rear portion of the awning cloth is mounted on a rain rail as a vehicle body member. In this configuration, a downward tensile force is exerted on the awning bows from the awning cloth.

In the openable vehicle roof structure disclosed in Patent Literature 1, when a roofline in a roof expanded state (namely, a stretched configuration of the awning cloth) is formed in such a manner that the roof is moderately inclined toward a back window, if the awning bows are largely folded toward the vehicle front side, a bending moment in the folding direction is generated in the awning bows due to the tensile force exerted from the awning cloth. Therefore, there is room for improvement in terms of stability and durability of the awning bows.

SUMMARY OF THE INVENTION

In view of the above, an object of the invention is to provide an openable vehicle roof structure which enables to enhance stability and durability of an awning bow and to enhance the design performance of a roofline in a roof expanded state by forming the awning bow in such a manner as to cancel out moments generated in the awning bow due to a tensile force exerted from an awning cloth.

An aspect of the invention that accomplishes the aforementioned object is directed to an openable vehicle roof structure provided with an openable roof including an expandable and retractable awning frame, and an awning cloth for covering an outside of the awning frame. The openable vehicle roof structure is capable of openably covering a vehicle body upper portion by the openable roof. The awning frame is provided with an awning bow which supports the awning cloth when the awning frame is expanded. The awning bow includes a pair of left and right leg portions extending in up and down directions, and an upper side portion which connects between upper ends of the leg portions in a vehicle width direction, and which comes into contact with a lower surface of the awning cloth. Each of the leg portions of the awning bow is formed with two or more bent parts. At least one pair of the bent parts formed on each of the leg portions are configured such that moments generated in the awning bow due to a tensile force exerted from the awning cloth when the openable roof is in an expanded state act in such directions as to cancel out each other.

The number of the bent parts may be at least two or more.

The above and other objects, features and advantages of the present invention will be apparent from the following detailed description and the accompanying drawings.

DETAILED DESCRIPTION OF THE PREFERRED EMBODIMENT

Figure 1:
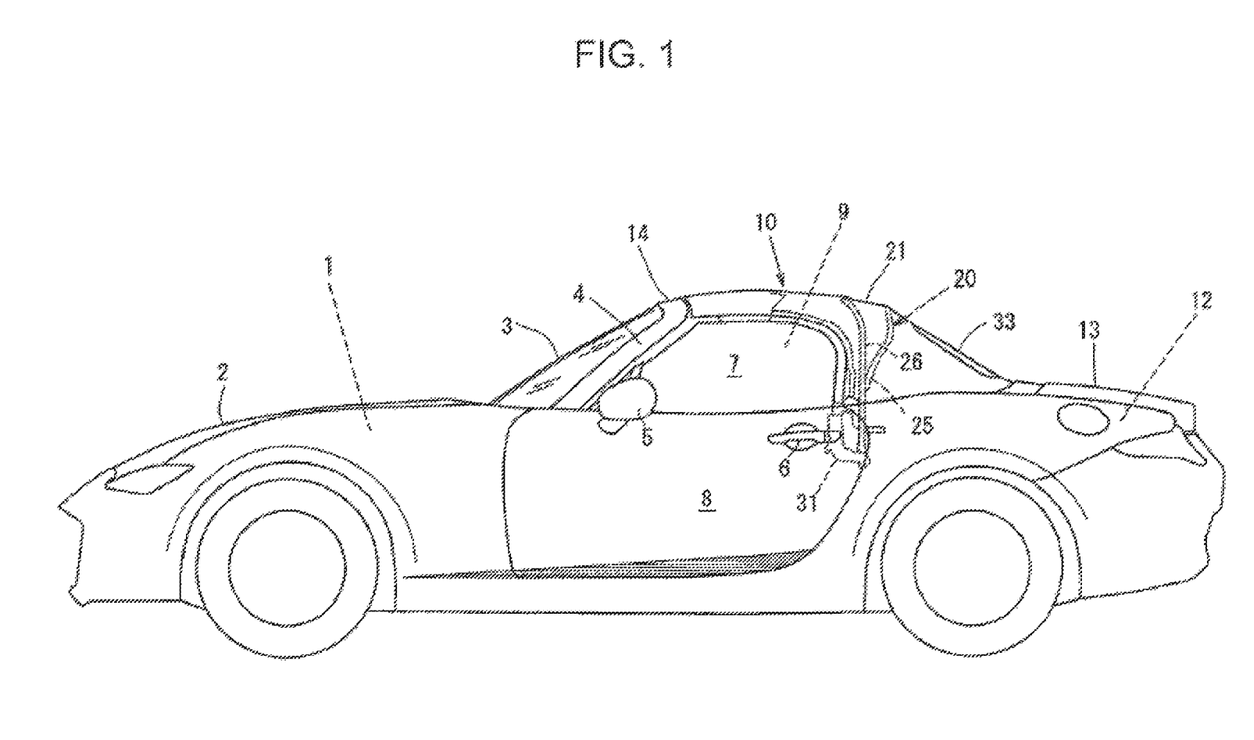
FIG. 1 is a diagram illustrating an openable vehicle roof structure embodying the invention, specifically, a side view of a vehicle in a roof expanded state.
Figure 2:
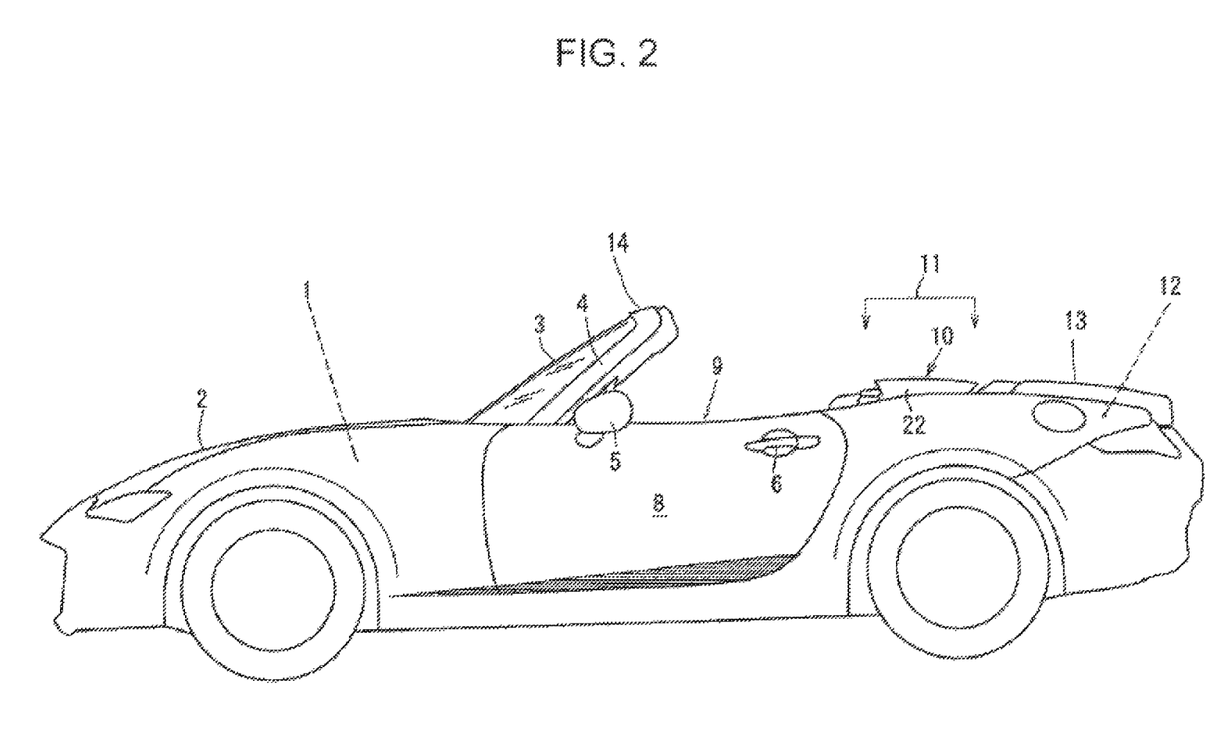
FIG. 2 is a side view of the vehicle in a roof retracted state.
Figure 3:
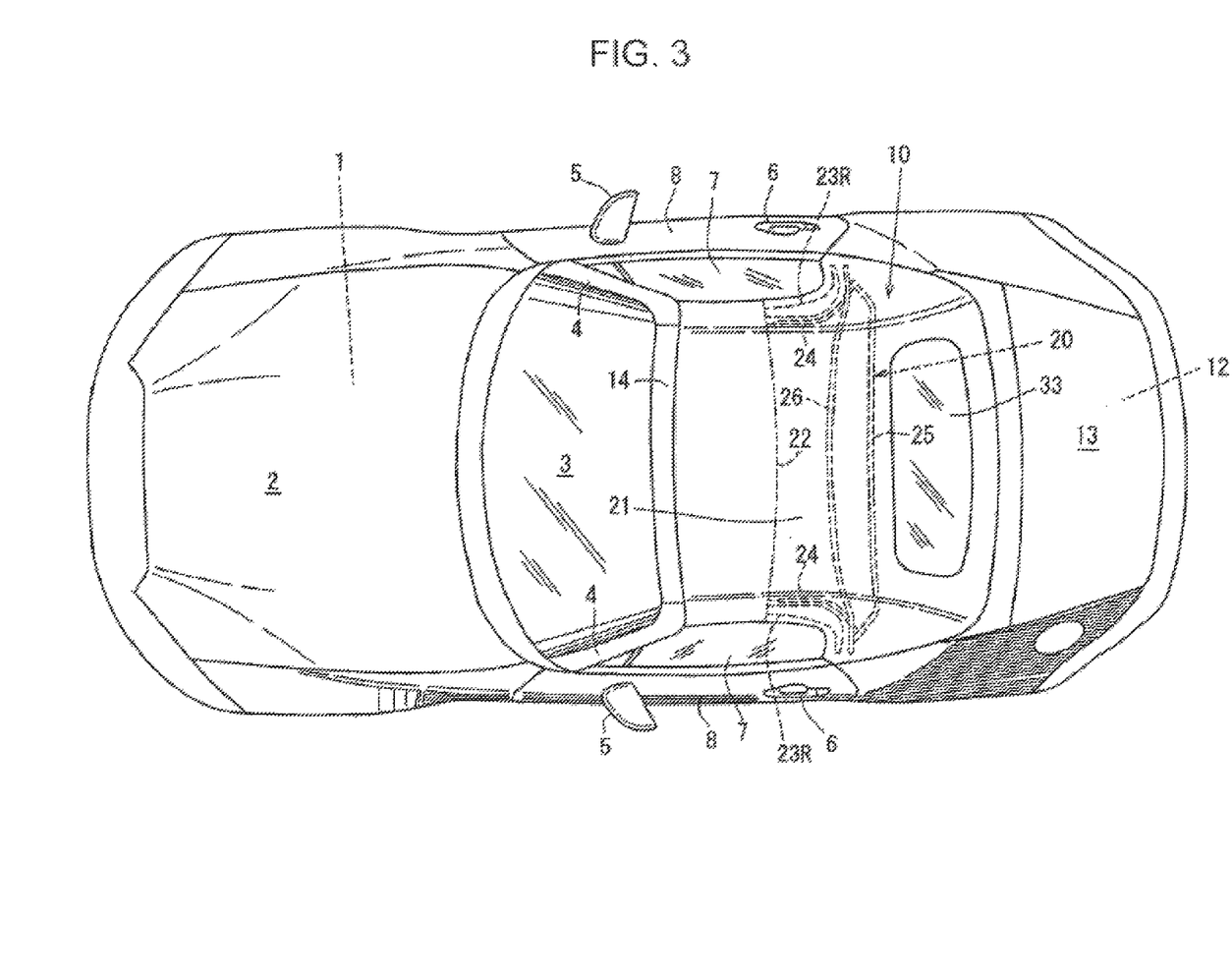
FIG. 3 is a plan view of the vehicle in the roof expanded state.

An openable vehicle roof structure embodying the invention is described in detail based on the drawings. FIG. 1 is a side view of a vehicle in a roof expanded state. FIG. 2 is a side view of the vehicle in a roof retracted state. FIG. 3 is a plan view of the vehicle in the roof expanded state.

As illustrated in FIG. 1, FIG. 2, and FIG. 3, a vehicle is provided with a hood 2 for openably covering an upper portion of an engine room 1, a front window glass 3 (a front window member) disposed behind the hood 2, and extending rearward and upward from a cowl portion of a vehicle body, a pair of left and right front pillars 4 and a front header 14 for supporting the front window glass 3.

The paired front pillars 4 are configured to extend in up and down directions while inclining along left and right edges of the front window glass 3. The front header 14 is configured to connect between upper ends of the paired front pillars 4 in the vehicle width direction, and to extend in the vehicle width direction along the upper edge of the front window glass 3.

A pair of left and right hinge pillars (not illustrated) having a closed section extending in up and down directions are formed on left and right portions of the vehicle body located at a position below the front pillars 4. Lower ends of the front pillars 4 are respectively connected to the hinge pillars. A pair of left and right side doors 8 are openably and closably connected to the hinge pillars via hinges, respectively. Each of the side doors 8 is provided with a door mirror 5, a door outer handle 6, and a door glass 7.

A vehicle cabin 9 is a space defined by a floor panel in a vehicle body lower portion, a dashboard lower panel (a dashboard panel) in a vehicle body front portion, a rear bulkhead in a vehicle body rear portion, and the aforementioned side doors 8. A driver's seat and a passenger's seat (both of which are not illustrated) are installed in the vehicle cabin 9. In other words, the vehicle exemplified in the embodiment is a so-called two-seater open car.

An openable roof 10 for openably covering an upper surface of the vehicle cabin 9 is provided on the vehicle body upper portion. The openable roof 10 is provided with an awning frame 20 which is expandable and retractable with respect to the vehicle body, and an awning cloth 21 for covering the outside of the awning frame 20. A pair of left and right base brackets 31 (see FIG. 1 and FIG. 4) are fixed to left and right walls of a rear portion of the vehicle cabin 9. The awning frame 20 is supported on the base brackets 31.

As illustrated in FIG. 2, an accommodation section 11 for accommodating the openable roof 10 is formed behind the vehicle cabin 9. A trunk room 12 (a baggage room) is formed further behind the accommodation section 11. The trunk room 12 is openably covered by a trunk lid 13. The trunk lid 13 is mounted to be pivotally movable up and down around a front portion of the trunk lid 13 as a pivot.

Figure 4:
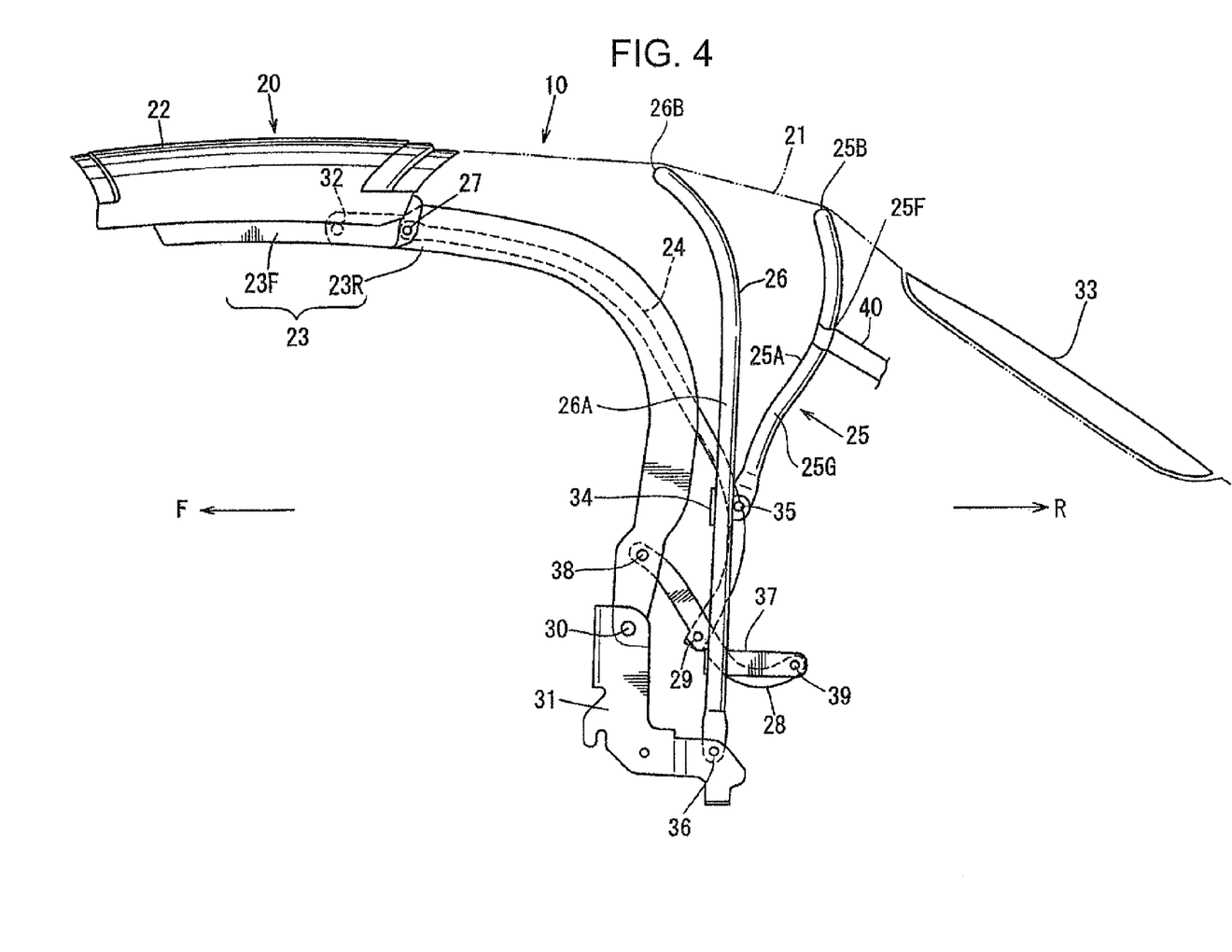
FIG. 4 is a side view illustrating a configuration of an awning frame in the roof expanded state.
Figure 5:
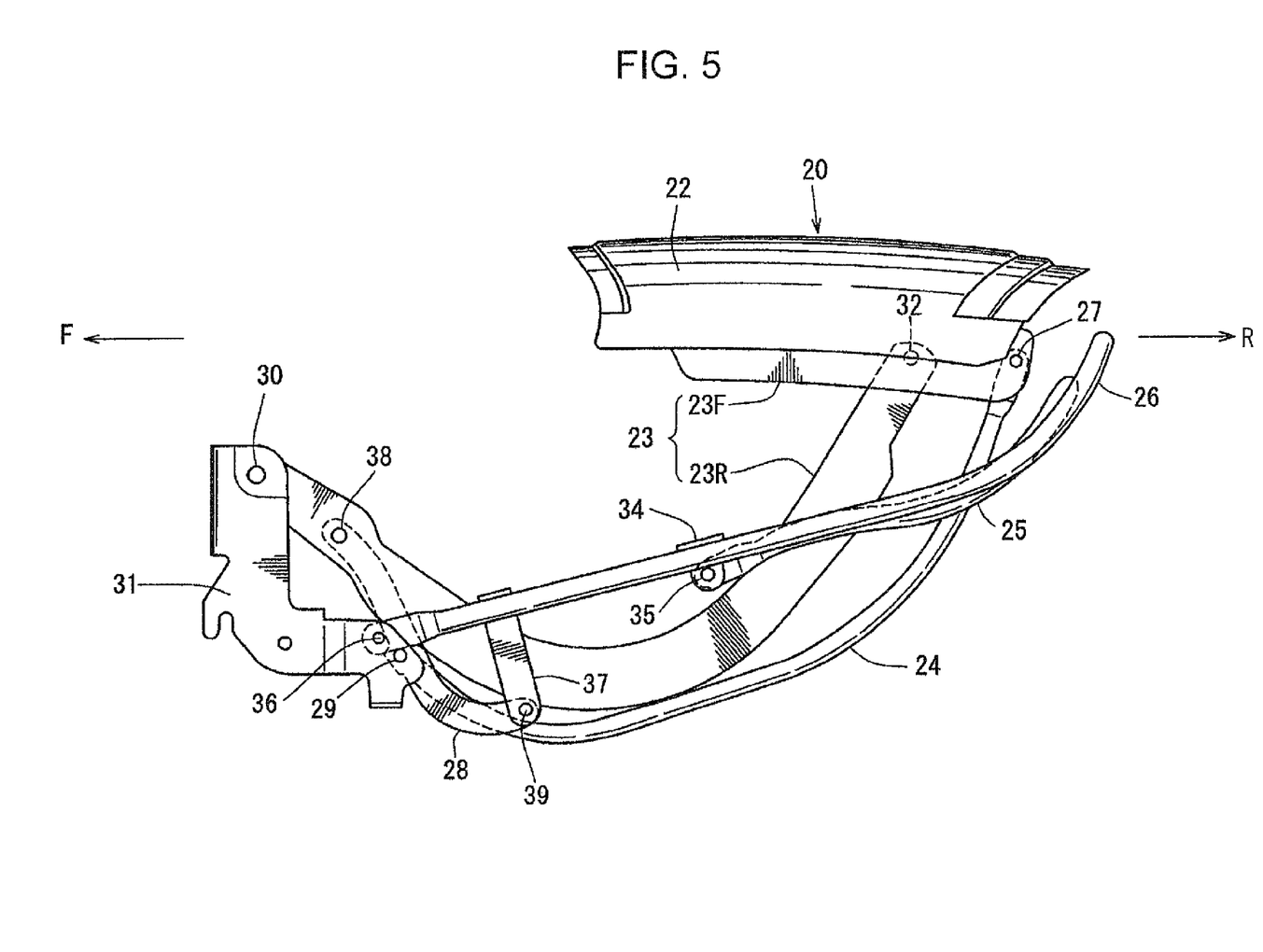
FIG. 5 is a side view illustrating a configuration of the awning frame in the roof retracted state.

Next, a configuration of the awning frame 20 is described. FIG. 4 is a side view illustrating a configuration of the awning frame 20 in a roof expanded state. FIG. 5 is a side view illustrating a configuration of the awning frame 20 in a roof retracted state. In FIG. 4 and FIG. 5, the arrow F direction indicates the vehicle front side, and the arrow R direction indicates the vehicle rear side.

As illustrated in FIG. 4 and FIG. 5, the awning frame 20 is provided with a top frame 22 formed at a front end of the awning frame 20; a pair of left and right side frames 23 formed on left and right sides of the top frame 22; a pair of left and right control links 24 which control the operations of the side frames 23; awning bows 25 and 26 (in the embodiment, two awning bows), each of which is disposed to bridge between the side frames 23, and each of which is configured to support a rear portion of the awning cloth 21 in an expanded state from below; and a pair of left and right link bars 28, each of which connects between the front awning bow 26 and the corresponding side frame 23.

The top frame 22 is a hard structural frame, which is disposed to extend in the vehicle width direction, and is attachably and detachably fixed to the front header 14 (see FIG. 3) on the vehicle body side.

Each of the side frames 23 includes a front frame 23F fixed to a lower surface of a side portion of the top frame 22, and a rear frame 23R extending from a rear end of the front frame 23F while curving along the opening edge of the door glass 7 (see FIG. 1).

The rear awning bow 25 is also called as a rear forming link, and is disposed on the rear side of the side frames 23 (at a position immediately in front of a window member 33 to be described later) in a roof expanded state. Specifically, the rear awning bow 25 includes a pair of left and right leg portions 25A extending in up and down directions, and an upper side portion 25B extending in the vehicle width direction in such a manner as to connect between upper ends of the leg portions 25A. The rear awning bow 25 has a gate shape such that the rear awning bow 25 is smoothly curved, as viewed from the front side of the vehicle (see FIG. 6).

The front awning bow 26 is also called as an intermediate forming link, and is disposed between the side frames 23 and the rear awning bow 25 in a roof expanded state. Although detailed illustration is omitted, the front awning bow 26 has a gate shape such that the length of the front awning bow 26 is long in up and down directions (the height of the front awning bow 26 is high), as compared with the rear awning bow 25. Specifically, the front awning bow 26 includes a pair of left and right leg portions 26A whose lengths are relatively large in up and down directions, and an upper side portion 26B extending in the vehicle width direction in such a manner as to connect between upper ends of the leg portions 26A. In the following, the rear awning bow 25 is called as a first awning bow 25, and the front awning bow 26 is called as a second awning bow 26.

Each of the control links 24 has one end thereof connected to a rear end of the front frame 23F via a pin 27, and has the other end thereof connected to an intermediate portion of the corresponding link bar 28 via a pin 29. Specifically, allowing the pins 27 and 29 to function as pivot axes makes it possible to pivotally support the control link 24 with respect to the front frame 23F and with respect to the link bar 28 around the pins 27 and 29. The control links 24 function to control folding operations of the front frames 23F and the rear frames 23R when the openable roof 10 is expanded or retracted to be accommodated.

The front frame 23F has a substantially linear shape extending in the vehicle front and rear directions. The front frame 23F is configured to extend along the opening upper edge of the door glass 7 on the lower side of the top frame 22.

The rear frame 23R extends from the opening upper edge of the door glass 7 to the rear edge thereof while downwardly curving in such a manner as to bend substantially at a right angle on the rear side of the front frame 23F. Further, the rear frame 23R has a base end (a lower end) thereof connected to the base bracket 31 on the vehicle body side via a pin 30, and has a distal end (a front end) thereof connected to a rear portion of the front frame 23F via a pin 32. Specifically, allowing the pins 30 and 32 to function as pivot axes makes it possible to pivotally support the rear frame 23R with respect to the base bracket 31 and with respect to the front frame 23F around the pins 30 and 32.

As illustrated in FIG. 4, when the openable roof 10 is in a roof expanded state, the front frame 23F is disposed to stand upright from the pin 30 side in a posture such that the distal end of the front frame 23F faces the vehicle front side, and the front frame 23F is disposed to extend from the distal end of the rear frame 23R toward the vehicle front side. In this configuration, the side frame 23 constituted of the front frame 23F and the rear frame 23R has such a shape as to curve along the opening edge of the door glass 7 as a whole.

As illustrated in FIG. 4, a bracket 34 is fixed to the intermediate portion of the leg portion 26A of the second awning bow 26 in up and down directions. The first awning bow 25 is configured such that a base end (a lower end) of the leg portion 25A is connected to the bracket 34 via a pin 35. Further, the second awning bow 26 is configured such that a base end (a lower end) of the leg portion 26A is connected to a rear portion of the base bracket 31 via a pin 36. Specifically, allowing the pins 35 and 36 to function as pivot axes makes it possible to pivotally support the first awning bow 25 with respect to the brackets 34 (with respect to the second awning bow 26) around the pins 35, and makes it possible to pivotally support the second awning bow 26 with respect to the base brackets 31 around the pins 36.

A bracket 37 extending rearward is fixed to a lower portion of the leg portion 26A of the second awning bow 26. The link bar 28 has a front end thereof connected to a lower portion of the rear frame 23R via a pin 38, and has a rear end thereof connected to a rear portion of the bracket 37 via a pin 39. Specifically, allowing the pins 38 and 39 to function as pivot axes makes it possible to pivotally support the link bars 28 with respect to the rear frames 23R and with respect to the brackets 37 (with respect to the second awning bow 26) around the pins 38 and 39.

An unillustrated spring is wound around the pin 35 which supports the base end (the lower end) of the leg portion 25A of the first awning bow 25. The first awning bow 25 is urged in an upright direction by the urging forces of the springs. Further, a tether 40 is stretched to connect between the intermediate portions of the leg portions 25A of the first awning bow 25 in up and down directions, and the vehicle body. When the openable roof 10 is in a roof expanded state (see FIG. 4), the first awning bow 25 is held in the upright posture illustrated in FIG. 4 by the operations of the springs and the tether 40. On the other hand, when the openable roof 10 is in a roof retracted state (see FIG. 5), the tether 40 is contracted in such a direction as to shorten the length thereof, and the first awning bow 25 and the second awning bow 26 are disposed to overlap each other, while being inclined toward the vehicle rear side.

When the awning frame 20 is shifted from a roof expanded state (see FIG. 4) to a roof retracted state (see FIG. 5), each of the side frames 23 is moved toward the vehicle rear side, while being folded around the pin 32. Specifically, each of the rear frames 23R is pivotally moved (inclined) toward the vehicle rear side around the base end thereof (around the pin 30), and each of the front frames 23F is moved toward the vehicle rear side while maintaining a substantially horizontal posture thereof by the control function of the control link 24. As the front frames 23F are moved toward the vehicle rear side, the rear frames 23R are pivotally moved relatively toward the vehicle front side with respect to the front frames 23F around the pins 32. This makes it possible to change the connection angle between each of the front frame 23F and each of the rear frames 23R, whereby the side frames 23 are folded.

Finally, when the openable roof 10 is in a roof retracted state, as illustrated in FIG. 5, the front frames 23F are disposed in a substantially horizontal posture at a position above the rear frames 23R which are inclined toward the vehicle rear side.

As illustrated in FIG. 4, when the openable roof 10 is in a roof expanded state, the awning cloth 21 is stretched in such a manner as to cover the entirety of an upper surface of the top frame 22, and the upper side portions 25B and 26B of the first and second awning bows 25 and 26. A rear portion of the awning cloth 21 is disposed to extend obliquely downward from the upper side portions 25B and 26B of the first and second awning bows 25 and 26 toward the vehicle rear side. Further, the rear portion of the awning cloth 21 is mounted on a rain rail (not illustrated) provided at a position immediately below the beltline of the vehicle body rear portion. The window member 33 (a so-called back window) is mounted on the awning cloth 21 at a position between the first awning bow 25 and the rain rail, namely, at a portion of the awning cloth 21 corresponding to a rear surface of the vehicle cabin 9.

In FIG. 5 illustrating a roof retracted state, illustration of the awning cloth 21 is omitted. However, the awning cloth 21 is folded and accommodated between the top frame 22, the first awning bow 25, the second awning bow 26, and the rain rail.

Figure 6:
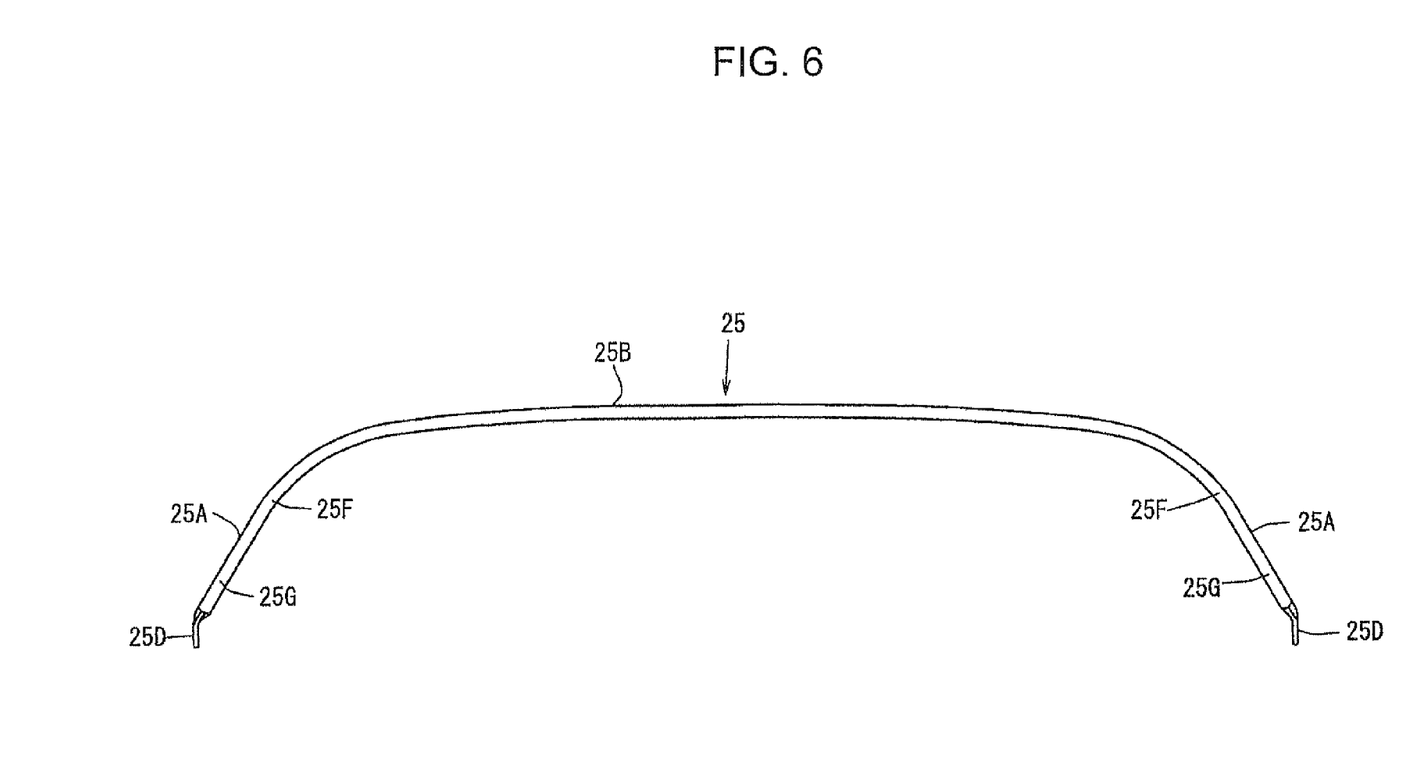
FIG. 6 is a front view of an awning bow.
Figure 7:
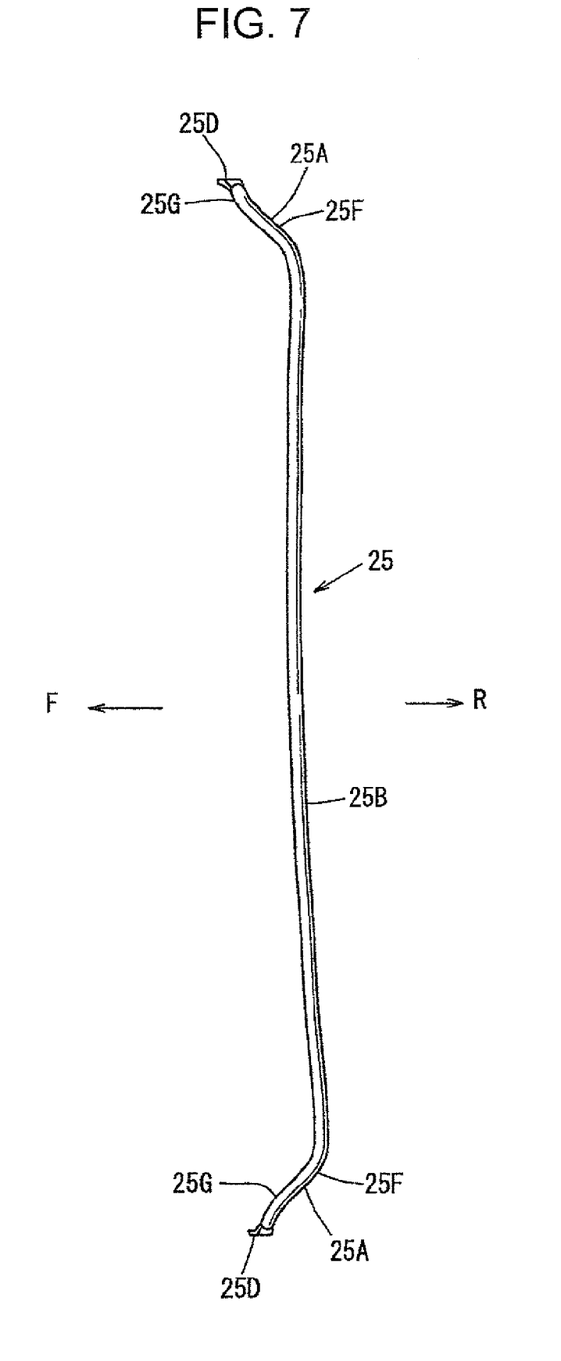
FIG. 7 is a plan view of the awning bow.
Figure 8:
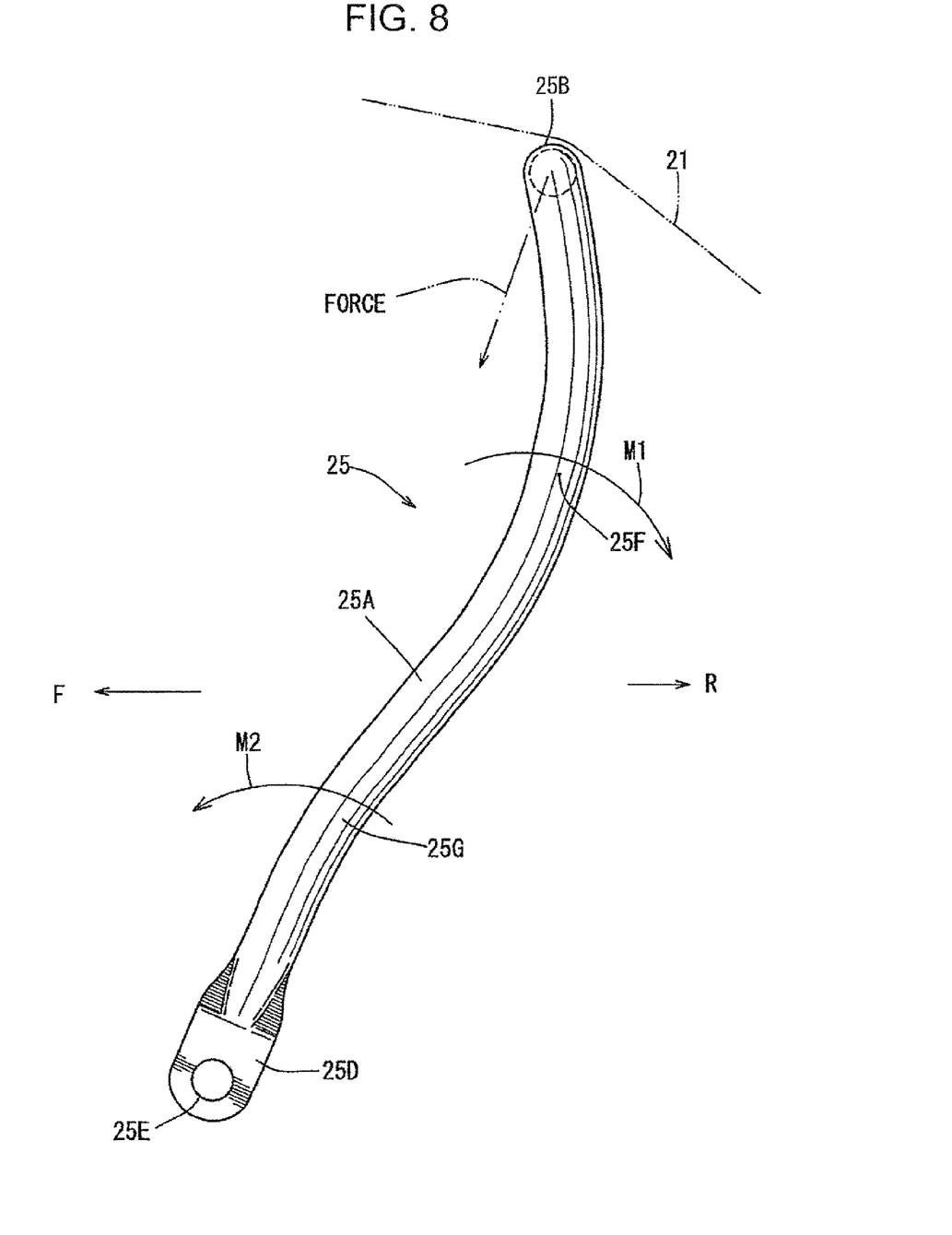
FIG. 8 is a side view of the awning bow.
Figure 9:
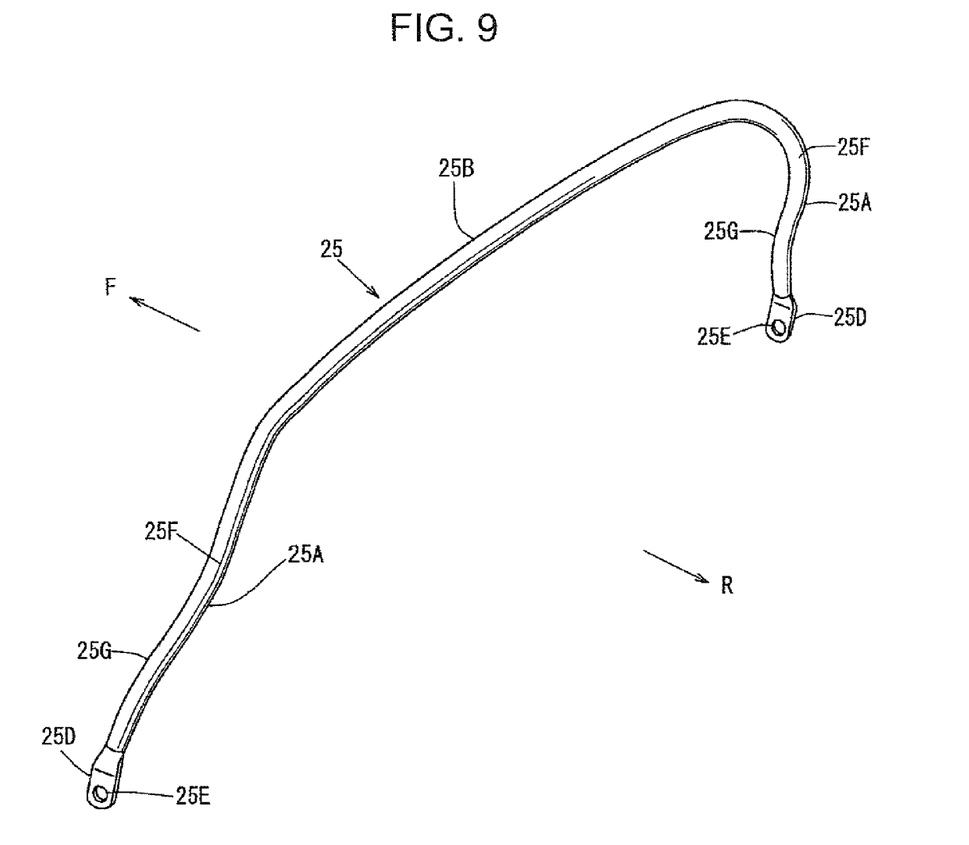
FIG. 9 is a perspective view of the awning bow.

FIG. 6 is a front view of the first awning bow 25, FIG. 7 is a plan view of the first awning bow 25, FIG. 8 is a side view of the first awning bow 25, and FIG. 9 is a perspective view of the first awning bow 25.

A flat mounting piece 25D to be connected to the bracket 34 (see FIG. 4) with use of the pin 35 is integrally formed with each of the lower ends of the paired leg portions 25A of the first awning bow 25. A hole portion 25E for receiving the pin 35 is formed in the mounting piece 25D (see FIG. 8 and FIG. 9).

As illustrated in FIG. 8 and FIG. 9, two bent parts 25F and 25G are formed on each of the paired leg portions 25A of the first awning bow 25. In other words, a pair of bent parts constituted of the upper bent part 25F and the lower bent part 25G are formed on each of the leg portions 25A.

As illustrated in FIG. 8, the upper bent part 25F is a bent part convex rearward in such a manner as to bulge toward the vehicle rear side, when viewed from the side of the vehicle. The lower bent part 25G is a bent part convex forward in such a manner as to bulge toward the vehicle front side, when viewed from the side of the vehicle.

As illustrated in FIG. 8, when the openable roof 10 is in a roof expanded state, a tensile force (indicated as FORCE in FIG. 8) of the awning cloth 21 is exerted on the upper side portion 25B of the first awning bow 25 in a direction from a contact portion between the lower surface of the awning cloth 21 and the upper side portion 25B and passing through the center of the upper side portion 25B (in the example of FIG. 8, in an obliquely downward direction toward the vehicle front side). In this configuration, the upper bent part 25F and the lower bent part 25G function to cancel out moments M1 and M2 generated in the first awning bow 25 due to a tensile force (FORCE) exerted from the awning cloth 21.

Specifically, as illustrated in the side view of FIG. 8, a tensile force (FORCE) of the awning cloth 21 exerted downward on the first awning bow 25 generates a bending moment M1 acting in such a direction as to fold the first awning bow 25 toward the vehicle rear side around the lower end of the first awning bow 25 (around the pin 35) at the upper bent part 25F, and generates a bending moment M2 acting in such a direction as to fold the first awning bow 25 toward the vehicle front side around the lower end of the first awning bow 25 (around the pin 35) at the lower bent part 25G. The bending moments M1 and M2 are moments acting in directions opposite to each other (in such directions as to cancel out each other). Therefore, the moments M1 and M2 are cancelled out or are remarkably reduced. Thus, it is possible to enhance stability and durability of the first awning bow 25.

As described above, the openable vehicle roof structure in the embodiment is provided with the openable roof 10 for openably closing the vehicle body upper portion. The openable roof 10 is provided with the expandable and retractable awning frame 20, and the awning cloth 21 for covering the outside of the awning frame 20. The awning frame 20 includes the first awning bow 25 which supports the awning cloth 21 when the awning frame 20 is expanded. The first awning bow 25 includes the pair of left and right leg portions 25A extending in up and down directions, and the upper side portion 25B which connects between the upper ends of the leg portions 25A in the vehicle width direction, and which comes into contact with the lower surface of the awning cloth 21. Each of the leg portions 25A is formed with a pair of bent parts (two bent parts) constituted of the upper bent part 25F and the lower bent part 25G. The paired bent parts 25F and 25G are configured such that when the openable roof 10 is in a roof expanded state, the moments M1 and M2 generated in the first awning bow 25 due to a tensile force (FORCE) exerted from the awning cloth 21 act in such directions as to cancel out each other (see FIG. 4 and FIG. 8).

According to the aforementioned configuration, the moments M1 and M2 generated in the first awning bow 25 due to a tensile force (FORCE) exerted from the awning cloth 21 (bending moments acting in such a direction as to fold the first awning bow 25 toward the vehicle forward side or toward the vehicle rear side) are cancelled out by the operation of the paired bent parts 25F and 25G. This makes it possible to cancel out the moments M1 and M2 or to remarkably reduce the moments M1 and M2. This is advantageous in enhancing stability and durability of the first awning bow 25, while enhancing the design performance of the openable roof 10 by forming a roofline when the openable roof 10 is in a roof expanded state to moderately incline toward the window member 33.

Further, in the embodiment, the upper bent part 25F is formed to be convex rearward, when viewed from the side of the vehicle, and the lower bent part 25G is formed to be convex forward, when viewed from the side of the vehicle (see FIG. 4 and FIG. 8).

According to the aforementioned configuration, it is possible to concurrently secure a space between the first awning bow 25 and each of the members on the vehicle body side, and secure an accommodation space for the folded awning cloth 21 when the openable roof 10 is retracted as illustrated in FIG. 5 (when the vehicle body upper portion is opened).

A preferred embodiment of the invention has been described as above. The invention, however, is not limited by the aforementioned configuration of the embodiment.

For instance, in the embodiment, a pair of bent parts 25F and 25G (two bent parts 25F and 25G) are formed on each of the paired leg portions 25A of the first awning bow 25. The number of the bent parts to be formed on each of the leg portions 25A is not limited to two. Alternatively, it is possible to form three or more bent parts. When three or more bent parts are formed on each of the leg portions 25A, at least one pair of the bent parts are formed in such a manner as to cancel out the moments as described above.

SUMMARY OF THE EMBODIMENT

The following is a summary of the features and the advantageous effects of the openable vehicle roof structure in the embodiment.

The openable vehicle roof structure is provided with an openable roof including an expandable and retractable awning frame, and an awning cloth for covering an outside of the awning frame. The openable vehicle roof structure is capable of openably covering a vehicle body upper portion by the openable roof. The awning frame is provided with an awning bow which supports the awning cloth when the awning frame is expanded. The awning bow includes a pair of left and right leg portions extending in up and down directions, and an upper side portion which connects between upper ends of the leg portions in a vehicle width direction, and which comes into contact with a lower surface of the awning cloth. Each of the leg portions of the awning bow is formed with two or more bent parts. At least one pair of the bent parts formed on each of the leg portions are configured such that moments generated in the awning bow due to a tensile force exerted from the awning cloth when the openable roof is in an expanded state act in such directions as to cancel out each other.

According to the aforementioned configuration, the moments generated in the awning bow due to a tensile force exerted from the awning cloth (bending moments acting in such a direction as to fold the awning bow toward the vehicle front side or toward the vehicle rear side) are cancelled out by the operation of the at least one pair of the bent parts. This makes it possible to cancel out the moments or to remarkably reduce the moments. This is advantageous in enhancing stability and durability of the awning bow, while enhancing the design performance of the openable roof by forming a roofline when the openable roof is in a roof expanded state to moderately incline toward a back window.

Preferably, in the openable vehicle roof structure, the at least one pair of the bent parts may be constituted of an upper bent part, and a lower bent part located at a position lower than the upper bent part, the upper bent part may be formed to be convex rearward when viewed from a side of a vehicle, and the lower bent part may be formed to be convex forward when viewed from the side of the vehicle.

As described above, when the upper bent part is formed to be convex rearward, and the lower bent part is formed to be convex forward, it is possible to concurrently secure a space between the awning bow and each of the members on the vehicle body side, and secure an accommodation space for the folded awning cloth when the openable roof is retracted (when the vehicle body upper portion is opened).

While the invention of the present application has been described appropriately and fully by way of the embodiment as described above with reference to the drawings in order to express the present invention, it should be appreciated that any one skilled in the art can readily change and/or modify the embodiment described above. Therefore, it should be understood that a changed embodiment or a modified embodiment implemented by any one skilled in the art is included within the scope of the appended claims unless the changed embodiment or the modified embodiment is of a level that deviates from the scope of the appended claims.

What is claimed is:

1. An openable vehicle roof structure provided with an openable roof including an expandable and retractable awning frame, and an awning cloth for covering an outside of the awning frame, and capable of openably covering a vehicle body upper portion by the openable roof, wherein
the awning frame includes an awning bow which supports the awning cloth when the awning frame is expanded,
the awning bow includes a pair of left and right leg portions extending in up and down directions, and an upper side portion which connects between upper ends of the leg portions in a vehicle width direction, and which comes into contact with a lower surface of the awning cloth,
each of the leg portions of the awning bow is formed with an upper bent part and a lower bent part located at a position lower than the upper bent part,
the upper bent part is formed to be convex rearward when viewed from a side of a vehicle, and the lower bent part is formed to be convex forward when viewed from the side of the vehicle, so that moments generated in the awning bow due to a tensile force exerted from the awning cloth when the openable roof is in an expanded state act in such directions as to cancel out each other, and the upper bent part is continuously curved between the upper side portion and the lower bent part when viewed from the side of the vehicle.

2. An openable vehicle roof structure provided with an openable roof including an expandable and retractable awning frame, and an awning cloth for covering an outside of the awning frame, and capable of openably covering a vehicle body upper portion by the openable roof, wherein the awning frame includes an awning bow which supports the awning cloth when the awning frame is expanded, the awning bow includes a pair of left and right leg portions extending in up and down directions, and an upper side portion which connects between upper ends of the leg portions in a vehicle width direction, and which comes into contact with a lower surface of the awning cloth, each of the leg portions of the awning bow is formed with two or more bent parts, at least one pair of the bent parts formed on each of the leg portions are configured such that moments generated in the awning bow due to a tensile force exerted from the awning cloth when the openable roof is in an expanded state act in such directions as to cancel out each other, the awning frame further includes a front awning bow in front of the awning bow, the front awning bow includes a pair of left and right leg portions extending in up and down directions, and an upper side portion which connects between upper ends of the leg portions in a vehicle width direction, and which comes into contact with a lower surface of the awning cloth, the leg portion of the front awning bow has a lower end portion pivotally connected to a distal end portion of the leg portion of the awning bow, and the awning bow and the front awning bow are disposed substantially to overlap each other, while being inclined toward the vehicle rear side, when the openable roof is in a retracted state.

\* \* \* \* \*